United States Patent [19]

Chappell et al.

[11] Patent Number: 5,585,842
[45] Date of Patent: Dec. 17, 1996

[54] CATV FREQUENCY SWEEP TESTING USING RF TRANSMITTER TO GENERATE TEST SIGNALS

[75] Inventors: Daniel K. Chappell, Fishers; Timothy R. Voght, Indianapolis, both of Ind.

[73] Assignee: Wavetek Corporation, Indianapolis, Ind.

[21] Appl. No.: 308,452

[22] Filed: Sep. 19, 1994

[51] Int. Cl.$^6$ ............ H04N 17/00; H04N 7/10; H04N 1/00; H04B 17/00
[52] U.S. Cl. ............ 348/192; 348/6; 455/3.1; 455/67.4
[58] Field of Search ............ 348/6, 181, 192, 348/193; 455/3.1, 6.1, 67.1, 67.3, 67.4, 67.7; H04N 7/10, 17/00, 17/02

[56] References Cited

U.S. PATENT DOCUMENTS

| | | | |
|---|---|---|---|
| 3,651,403 | 3/1972 | Fluck, Jr. | 455/4.1 |
| 4,408,227 | 10/1983 | Bradley | 348/192 |
| 4,700,222 | 10/1987 | Large et al. | 348/192 |
| 4,710,969 | 12/1987 | Fluck, Jr. et al. | 455/67.3 |
| 5,073,822 | 12/1991 | Gumm et al. | 348/193 |
| 5,233,418 | 8/1993 | Gumm et al. | 455/3.1 X |
| 5,473,361 | 12/1995 | Penney | 348/6 |

OTHER PUBLICATIONS

The Calan Model 1776/1777 Integrated Sweep System/Spectrum Analyzer.

*Primary Examiner*—Victor R. Kostak
*Assistant Examiner*—John W. Miller
*Attorney, Agent, or Firm*—Ice Miller Donadio & Ryan

[57] ABSTRACT

A method, system and apparatus for frequency sweeping and frequency swap testing a CATV system wherein the CATV system has a plurality of channels and is transmitting television signals over at least some of the channels. The system includes a head end test unit coupled to the CATV system at its head end and a remote test unit coupled to the CATV system at a location remote from the head end. The head end test unit sweeps the CATV system by either generating and transmitting test signals at the channel frequencies over the CATV system or, if a television signal is being transmitted on a channel, using the television signal as the test signal. The head end test unit also measures the signal levels of the test signals and at the end of the sweep, transmits telemetry signals, which include the frequencies to be swept and the measured signal levels, over the CATV system to the remote test unit using the same transmitter that it used to generate and transmit the test signals. The remote test unit receives the information transmitted by the head end test unit and sweeps the same frequencies simultaneously with the head end test unit. During the sweep, the remote test unit measures the signal levels of the test signals and television signal test signals. After receiving the next set of telemetry signals, the remote test unit uses the information regarding the signal levels measured by the head end test unit and the signal levels it measured to determine the frequency response of the CATV system.

31 Claims, 5 Drawing Sheets

CATV FREQUENCY SWEEP TESTING USING RF TRANSMITTER TO GENERATE TEST SIGNALS

BACKGROUND OF THE INVENTION

This invention relates to a method and system for testing cable (CATV) systems, and more particularly, to a method and system for a frequency sweep test instrument for testing the frequency response of a CATV system.

Cable televisions systems, often called CATV systems, have many miles of coaxial cable strung throughout their service area with amplifiers and other elements interspersed throughout. The CATV system has a number of channels over which are transmitted television signals. Each channel has a unique frequency. The subscribers to the CATV system are connected to the coaxial cable system.

To ensure the quality of the signals being transmitted over the coaxial cable system, the coaxial cable system must be periodically checked. Also, as is the case with any system having the complexity of cable systems, cable systems suffer periodic problems and failures. Often, such problems and failures results from the failure or degradation of an individual component of the cable system, such as an amplifier, and only a portion of the cable system is affected. When this happens, the individual component causing the problem must be located so that it can be repaired or replaced.

One way in which coaxial cable systems are checked is by testing their frequency response over the various channels. Heretofore, this has been accomplished by injecting a signal into the cable system at its front end and measuring the signal level at locations remote from the head end. Since cable systems have the capacity for carrying several channels and the frequency response of the coaxial cable may vary with frequency, it is necessary to check the cable system by measuring its frequency response for each channel that can be carried by the cable system. This is accomplished by sweeping the channels that can be carded by the coaxial cable system by sequentially injecting a signal into the cable system at each channel frequency at the cable systems' head end and measuring the signal level of each test signal at the remote location or locations.

To frequency sweep test a cable system, two pieces of test equipment are typically used, a head end test unit and a remote test unit. The head end test unit is connected to the cable system at its head end. The remote test unit is connected to the coaxial cable at a desired location remote from the head end. The head end unit runs the test by sending telemetry signals to the remote test unit followed by the frequency sweep test signals. The telemetry signals sync the remote test unit to the head end test unit and both units then sweep the cable system, the head end unit injecting test signals at each frequency and the remote unit measuring signal strength. At the end of the sweep, the head end test unit then again sends telemetry signals to the remote test unit. In addition to syncing the remote test unit to the head end test unit for the next sweep, the telemetry signals also contain information indicating the frequencies to be swept, and the voltage level at which the test signals will be injected. The remote test unit receives these results and based on its own measurements and the injection level indicated in the telemetry message, determines the frequency response of the cable system. The remote test unit typically displays this frequency response.

A problem with this heretofore used frequency sweep testing technique is that it disrupts service to the subscribers. When the sweep is being performed, the test signal being injected at each channel by the head end test unit will interfere with the subscriber's receptions of that channel. Although this interruption is brief, it nevertheless causes a noticeable interruption in the subscriber's reception of that channel. Moreover, when conducting the frequency sweep test, the cable system is usually swept several times.

The head end test unit heretofore used have required two transmitter sections. One transmitter section is used to generate and transmit the telemetry signals to the remote test unit and the other transmitter section is used to generate and transmit the test signals.

It is an object of this invention to provide a frequency sweep test method and system that eliminates the need to disrupt service when conducting the sweep test.

It is also an object of this invention to reduce the cost and complexity of the head end test unit by replacing the two transmitters in the head end test unit with one.

SUMMARY OF THE INVENTION

In accordance with this invention, a method, and apparatus for frequency sweeping a CATV system having a plurality of channels is provided. Each channel of the CATV system has a unique frequency and the CATV system transmits television signals over at least some of the channels. The method and apparatus includes a RF transmitter for generating test signals at a plurality of the unique channel frequencies and transmitting the test signals over the CATV system during a sweep cycle. A controller coupled to the RF transmitter has a memory in which is stored a list of the channel frequencies to be swept. The controller indexes through the list of channel frequencies during the sweep cycle and determines for each channel frequency in the list whether a television signal is being transmitted on that channel frequency, causes the RF transmitter to generate and transmit a test signal at each such channel frequency if a television signal is not being transmitted on that channel, and causes the RF transmitter not to transmit a test signal at those channel frequencies for the channels on which television signals are being transmitted wherein the television signals are used as test signals on those channels on which the television signals are being transmitted. The apparatus also includes a RF receiver for receiving during the sweep cycle the plurality of test signals and the television signal test signals being transmitted over the CATV system wherein the signal levels of the test signals and television signal test signals are measured and input into the controller and stored in the controller's memory as is data indicative of the frequency of each measured signal. During a telemetry cycle, the controller outputs the stored data indicative of the measured signal levels and data indicative of the frequencies of the measured signals to the same RF transmitter which generates the test signals. The RF transmitter generates telemetry signals from the outputted data and transmits the telemetry signals over the CATV system.

In a method and system for frequency sweep testing a CATV system according to the invention, the above described apparatus comprises a head end test unit coupled to the CATV system at its head end. The system further includes a remote test unit which is coupled to the CATV system at a location remote from the head end of the CATV system. The remote test unit has a controller having a memory and a RF receiver for receiving the test signals, television signal test signals and telemetry signals transmitted over the CATV system. The remote test unit converts the telemetry signals to data which contains the list of frequencies to be swept during the next sweep cycle and the measured signal levels of the frequencies swept during the prior sweep cycle transmitted from the head end test unit which is stored in its controller's memory. The controller of the remote test unit causes the remote test unit to begin the next sweep cycle at the end of the telemetry cycle and during the sweep cycle the remote test unit measures the signal levels of the test signals and television signal test signals received by the RF receiver of the remote test unit and data indicative of the measured signal levels is input into and stored in memory of the remote test unit controller. Based on the measured signal levels received from the head end test unit and the signal levels the remote test unit measures, the remote test unit determines the frequency response of the CATV system and preferably outputs data indicative of the results, such as by displaying the results on a display.

Additional features and advantages of the invention will become apparent to those skilled in the art upon consideration of the following detailed description of preferred embodiments of the invention, exemplifying the best modes of carrying out the invention as presently perceived. The detailed description particularly refers to the accompanying figures in which:

DETAILED DESCRIPTION OF THE DRAWINGS

Figure 1:
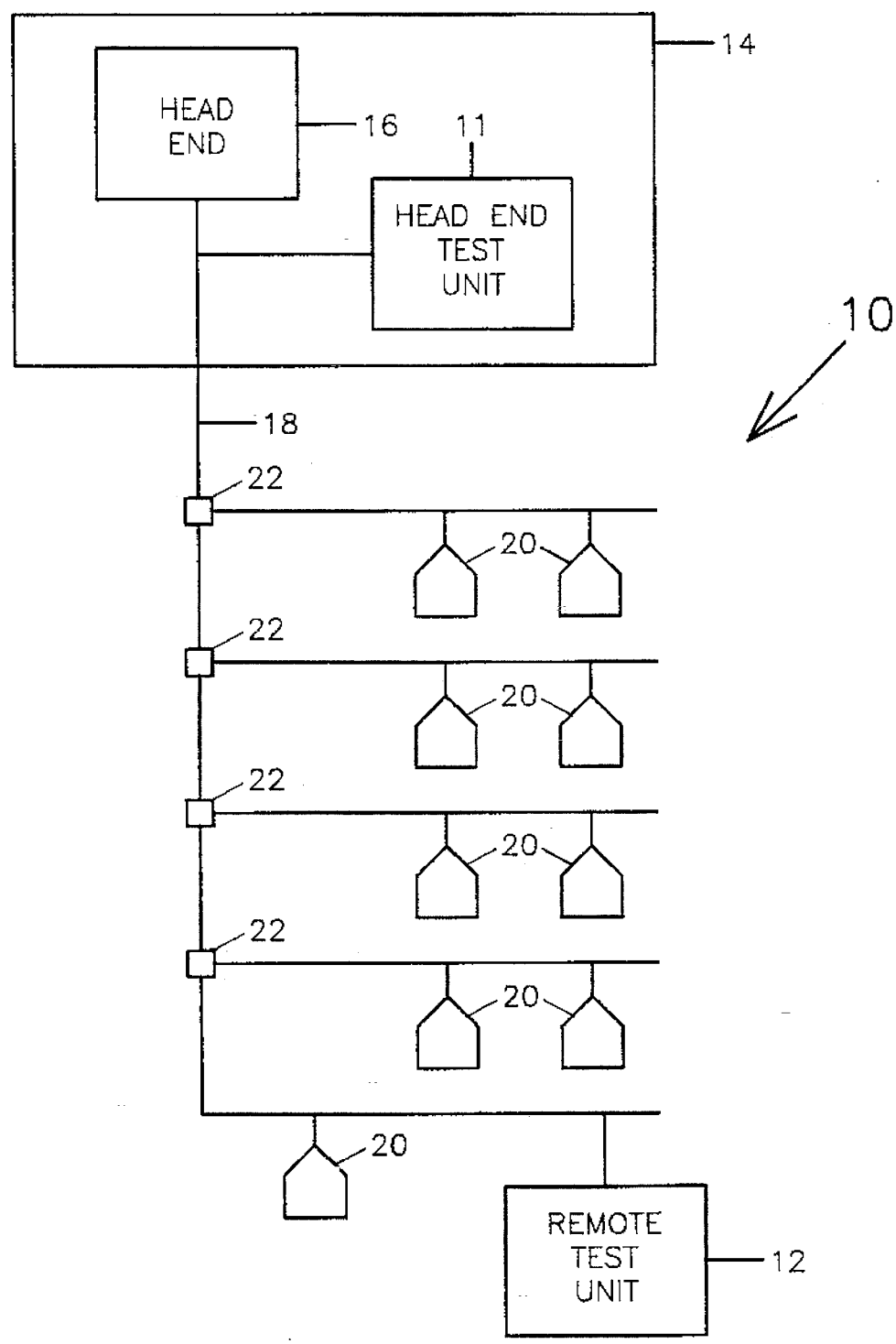
FIG. 1 is a block diagram representation of a CATV system having a frequency sweep test system coupled thereto.

FIG. 1 is a block diagram representation of a cable system 10 to which a head end test unit 11 and a remote test unit 12 are coupled. Cable system 10 includes a cable head end facility 14 at which a head end 16 of the cable system 10 is located. A coaxial cable 18 extends from head end 16 throughout the area served by cable system 10. Subscribers 20 are connected to coaxial cable 18 at multiple points along its run. Interspersed throughout the run of coaxial cable 18 are various elements, such as amplifiers 22, which are part of cable system 10.

As is conventional, head end 16 receives a plurality of television signals, such as from satellite receivers (not shown) and antennas located at the head end facility 14 and converts these television signals to appropriate frequencies for transmission over coaxial cable 18 to subscribers 20. In this regard, cable system 10 might be designed to handle forty channels. Each of the forty channels would have a unique frequency. Frequencies are adjacent each other and spaced from each other by a set amount, i.e., typically 6 MHz.

Figure 2:
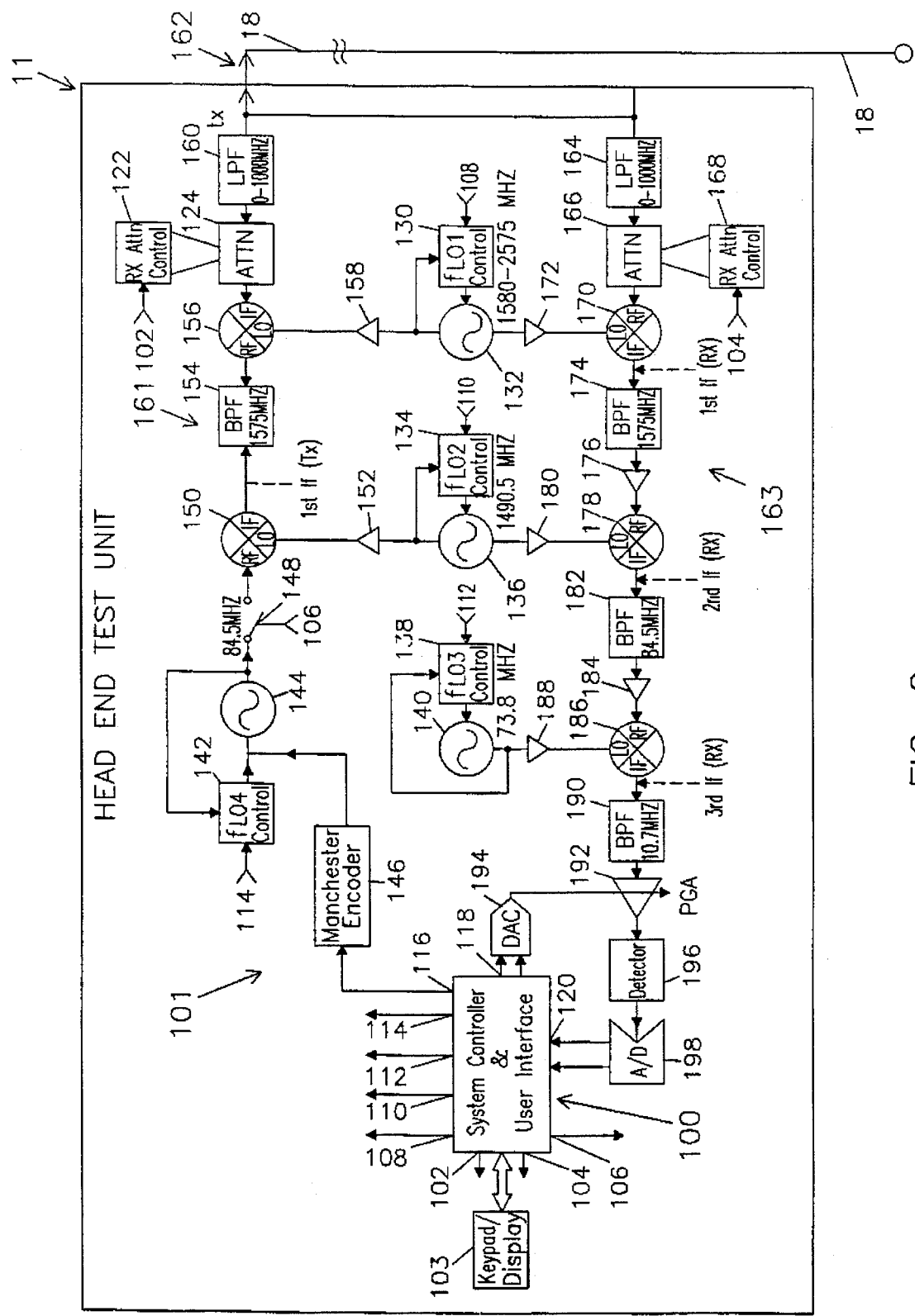
FIG. 2 is a block diagram of a head end test unit according to the invention.

Referring to FIG. 2, head end test unit 11 is shown in more detail in block diagram form. Head end test unit 11 includes a system controller and user interface 100 and a combined transmitter/receiver 101, as will be described in more detail below. System controller and user interface 100 has a transmitter attenuator control output 102, a receiver attenuator control output 104, a RF on/off control output 106, oscillator frequency control data outputs 108, 110, 112, 114, serial data output 116, data outputs 118, and data inputs 120. Illustratively, system controller and user interface 100 is a microcomputer with conventional associated circuitry, such as a MC68331 microcomputer manufactured by Motorola, Inc., Motorola, Microprocessor Product Group, 6501 William Cannon Drive West, Oakhill, Tex. 78735, and outputs 102, 104, 106, 108, 110, 112, 114, 116, 118 and data inputs 120 are appropriate inputs and outputs of the microcomputer. A keypad/display 103 is illustratively coupled to appropriate data inputs/outputs of system controller and user interface 100.

Transmitter control output 102 is coupled to an attenuator controller 122 which in turn is coupled to an attenuator 124. RF on/off output 106 is coupled to RF on/off switch 148.

Oscillator frequency control data outputs 108 are coupled to a first oscillator controller 130 which in turn is coupled to a first voltage controlled oscillator 132. Oscillator frequency control data outputs 110 are coupled to a second oscillator controller 134 which in turn is coupled to a second voltage controlled oscillator 136. Oscillator frequency control data outputs 112 are coupled to a third oscillator controller 138 which in turn is coupled to a third voltage controlled oscillator 140. Oscillator frequency control data outputs 114 are coupled to a fourth oscillator controller 142 which in turn is coupled to a fourth voltage controlled oscillator 144. Illustratively, first oscillator controller 130 and first voltage controlled oscillator 132 comprise a programmable phase-lock-loop circuit (programmed via oscillator frequency control outputs 108 of system controller and user interface 100) as do second oscillator controller 134 and second voltage controlled oscillator 136 (programmed via oscillator frequency control outputs 110 of system controller and user interface 100), third oscillator controller 138 and third voltage controlled oscillator 140 (programmed via oscillator frequency control outputs 112 of system controller and user interface 100), and fourth oscillator controller 142 and fourth voltage controlled oscillator 144 (programmed via oscillator frequency control outputs 114 of system controller and user interface 100).

Serial data output 116 is coupled to an input of a manchester encoder 146. (Manchester encoder 146 is illustratively a HD3-6409-9 manufactured by Hitachi, America Ltd., Semiconductor/IC Sales and Service Div., 1800 Bering Drive, San Jose, Calif. 95112.) An output of manchester encoder 146 is coupled to an input of VCO 144. An output of VCO 144 is coupled through RF ON/OFF switch 148 to an RF input of a mixer 150. An output of second voltage controlled oscillator 136 is coupled through a buffer amplifier 152 to a local oscillator input of mixer 150. An IF output of mixer 150 is coupled through a 1575 MHz band pass filter 154 to a RF input of a mixer 156. An output of first voltage controlled oscillator 132 is coupled through a buffer amplifier 158 to a local oscillator input of mixer 156. An IF output of mixer 156 is coupled through attenuator 124 and a 0–1000 MHz low pass filter 160 to an RF output jack 162 to which is coupled coaxial cable 18. Low pass filter 160, attenuator 124, attenuator controller 122, mixer 156, buffer amplifier 158, voltage controlled oscillator 132, oscillator controller 130, band-pass filter 154, mixer 150, buffer amplifier 152, voltage controlled oscillator 136, oscillator controller 134, RF switch 148, voltage controlled oscillator 144 and oscillator controller 142 comprise an RF transmitter 161. As will be explained below, voltage controlled oscillators 132, 136 and their controllers also comprise part of a RF receiver 163.

RF transmitter 161 and RF receiver 163 are part of combined RF transmitter/receiver 101.

Head end test unit 11 also includes a RF receiver 163 which includes a 0–1000 MHz low pass filter 164, attenuator 166, attenuator controller 168, mixer 170, buffer amplifier 172, 1575 MHz band-pass filter 174, buffer amplifier 176, mixer 178, buffer amplifier 180, 84.5 MHz band-pass filter 182, buffer amplifier 184, mixer 186, buffer amplifier 188, 10.7 MHz band-pass filter 190, programmable gain amplifier 192, digital to analog converter 194, detector 196, and analog to digital converter 198. RF jack 162 is coupled through 0–1000 MHz low pass filter 164 and attenuator 166 to a RF input of mixer 170. Attenuator controller 168 has an input coupled to receiver attenuator control output 104 of system controller and user interface 100 and an output coupled to attenuator 166.

Voltage controlled oscillator 132 has its output also coupled through buffer amplifier 172 to a local oscillator input of mixer 170. An IF output of mixer 170 is coupled through 1575 MHz band-pass filter 174 and buffer amplifier 176 to a RF input of mixer 178. Voltage controlled oscillator 136 has its output also coupled through buffer amplifier 180 to a local oscillator input of mixer 178. An IF output of mixer 178 is coupled through buffer amplifier 184 to a RF input of mixer 186.

Voltage controlled oscillator 140 has its output coupled through buffer amplifier 188 to a local oscillator input of mixer 186. An IF output of oscillator 186 is coupled through 10.7 MHz band-pass filter 190 to a signal input of programmable gain amplifier 192. A control input of programmable gain amplifier 192 is coupled to an output of digital to analog converter 194. Data inputs of digital to analog converter 194 are coupled to data bus outputs 118 of system controller and user interface 100.

An output of programmable gain amplifier 192 is coupled to an input of peak detector 196. An output of peak detector 196 is coupled to an input of analog to digital converter 198. Data outputs of analog to digital converter 198 are coupled to data inputs 120 of system controller and user interface 100.

Figure 3:
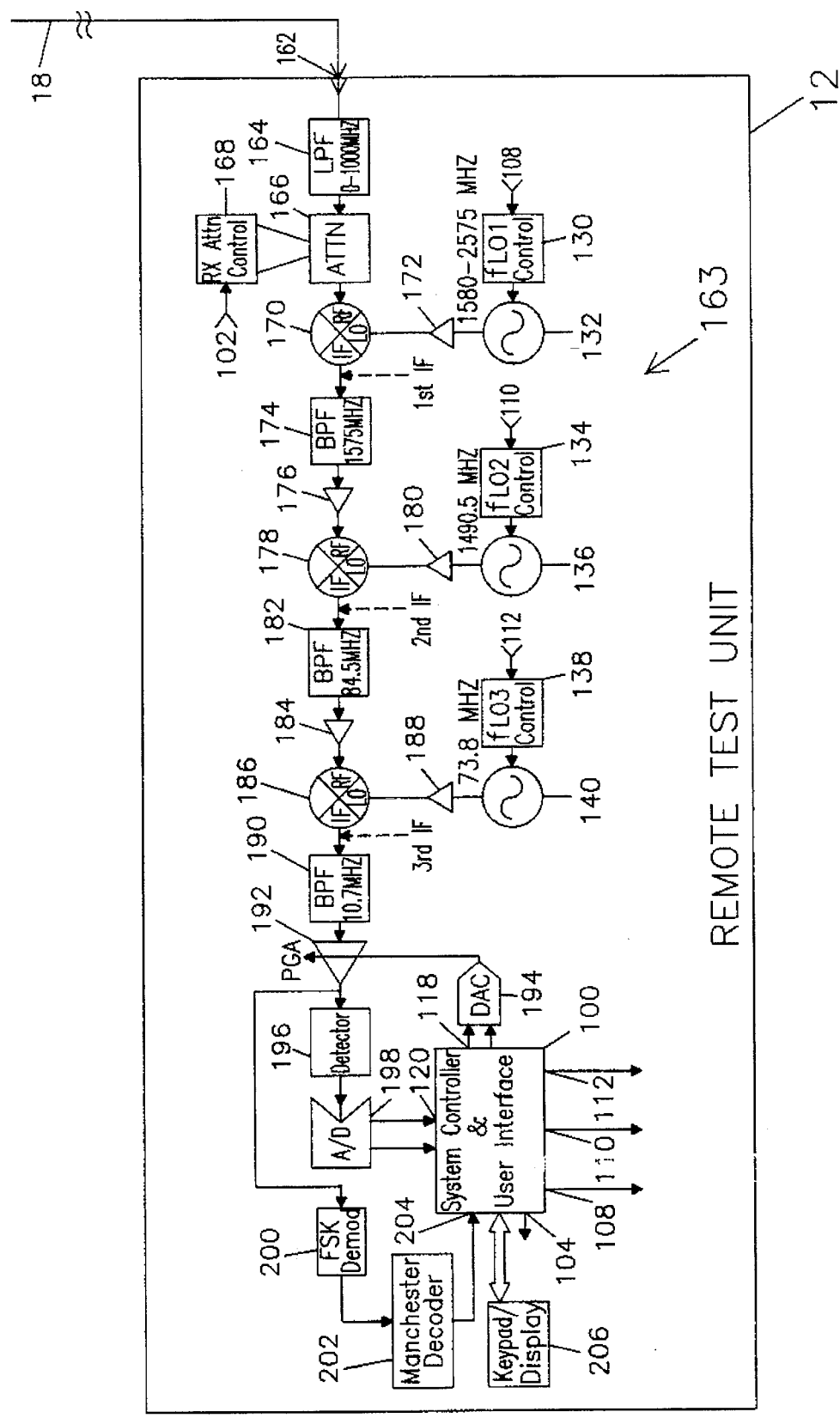
FIG. 3 is a block diagram of a remote test unit according to the invention.

Referring to FIG. 3, remote test unit 12 is shown in greater detail. Remote test unit 12 comprises a RF receiver which is identical to RF receiver 163 of head end test unit 11 except as described. Like elements between head end test unit 11 of FIG. 2 and remote test unit 12 of FIG. 3 are therefore identified with like reference numerals.

Remote test unit 12 includes, in addition to RF receiver 163, a FSK demodulator 200 having an input coupled to the output of programmable gain amplifier 192 and an output coupled to an input of manchester decoder 202. (Manchester decoder 202 is illustratively a HD3-6409-9.) An output of manchester decoder 202 is coupled to a serial data input 204 of system controller and user interface 100. Remote test unit 12 also includes a keypad/display 206 coupled to appropriate data inputs/outputs of system controller and user interface 100.

Head end test unit 11 utilizes a unique sweep insertion technique. The sweep signal and RF telemetry signals are both generated by RF transmitter 161 which has a sweep cycle wherein it is used for frequency response characterization and a telemetry cycle wherein it is used to transmit FSK data to the remote test unit 12.

Transmitter 161 and receiver 163 of head end test unit 11 operate in conjunction as a tracking type signal generator. That is, local oscillators used in RF receiver section 163 (voltage controlled oscillators 132, 136) are also used to generate the RF signals to be transmitted over coaxial cable 18 by head end test unit 11. In this regard, the transmit signal originates with voltage controlled oscillator 144 which is tuned to the same frequency, illustratively 84.5 MHz, as the second IF of RF receiver section 163. (The second IF of RF receiver section 163 is the IF output of mixer 178.)

During the telemetry cycle, the telemetry signals from system controller and user interface 100, encoded by manchester encoder 146, are inserted into or modulated onto the RF signal to be transmitted by RF transmitter 161 at voltage controlled oscillator 144. The signal generated by VCO 144 is mixed with the local oscillator signal generated by VCO 136 by mixer 150 which converts the signal generated by VCO 144 to the 1st IF frequency (illustratively 1575 MHz) of RF receiver 163. The 1575 MHz signal is then filtered by band-pass filter 154 and the filtered IF signal is mixed with the first local oscillator signal of RF receiver 163 which is generated by VCO 132. VCO 132 can be programmed by system controller and user interface 100 via oscillator controller 130 to any frequency between 1580 and 2575 MHz. The first local oscillator signal generated by VCO 132 is mixed with the first IF signal from mixer 150 (nominally, 1575 MHz) and the resultant signal (first local oscillator minus first IF) is a signal having a frequency between 5 MHz and 1000 MHz. This resultant signal is then attenuated by programmable attenuator 124, programmed by system controller and user interface 100 via attenuator controller 122, filtered by low pass filter 160, and transmitted onto coaxial cable 18 through RF jack 162. To provide a high degree of isolation when VCO 132 is being tuned, VCO 144 is turned off.

RF receiver 163 is a super heterodyne receiver. The signal from RF transmit section 161 is first filtered by low pass filter 164. The filtered signal is then passed through programmable attenuator 166 which is used to lower the signal level in the event that the received signal level is too high and is over driving RF receiver 163. The attenuated signal is then mixed by mixer 170 with the frequency to which the first local oscillator, VCO 132, is tuned, to generate the 1st IF of RF receiver 163 at the IF output of mixer 170, which is nominally 1575 MHz. The mixed signal is then filtered by band-pass filter 174 to remove any IF images and mixed by mixer 178 with the second local oscillator, VCO 136, of RF receiver section 163 to produce the second IF (nominally 84.5 MHz) of RF receiver 163 at the IF output of mixer 178. The second IF is filtered by band-pass filter 182 and mixed with the third local oscillator, VCO 140, of RF receiver section 163 by mixer 186 to produce the third IF (nominally 10.7 MHz) of RF receiver 163. The third IF of RF receiver section 163 is filtered by band-pass filter 190 and then passed through programmable gain amplifier 192 and the output of programmable gain amplifier 192 is rectified by detector 196. The output of detector 196 is digitized by analog to digital converter 198 and this digitized value is read by system controller and user interface 100. System controller and user interface 100 uses the digitized value it reads from analog to digital converter 198 to determine how much gain to program into programmable gain amplifier 196 via digital to analog converter 194 so as to provide a signal to analog to digital converter 198 having a sufficient magnitude so that accurate level measurements can be made.

RF receiver 163 of remote test unit 12 operates identically to RF receiver section 163 of head end test unit 11 so its operation will not be separately described. Remote test unit 12 further includes FSK demodulator 200 and manchester decoder 202 which are used to demodulate the FSK modulated telemetry signals and then decode them for subsequent input into system controller and user interface 100 of remote test unit 12.

Figure 4:
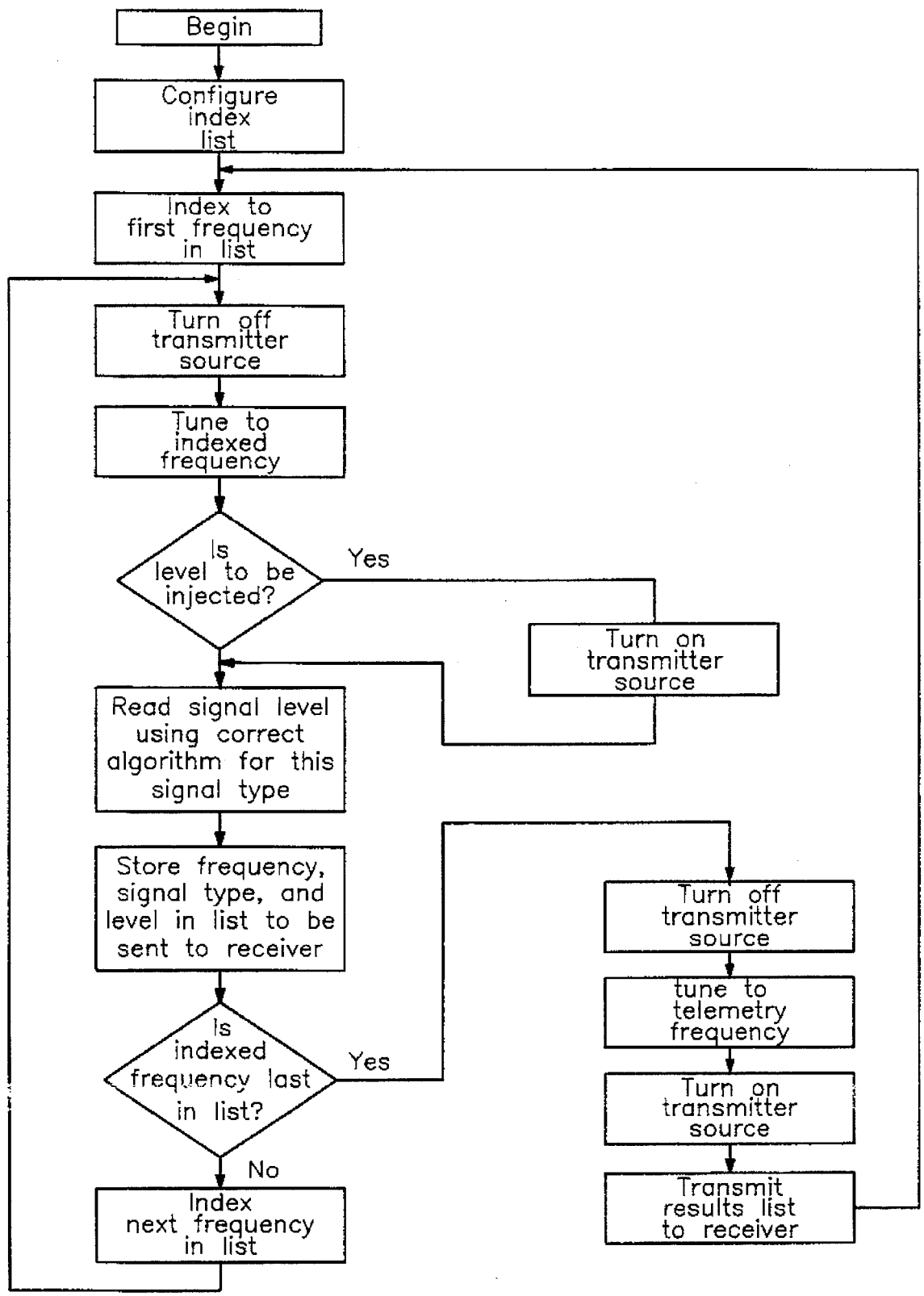
FIG. 4 is a flow chart showing the operation of the head end test unit of FIG. 2.
Figure 5:
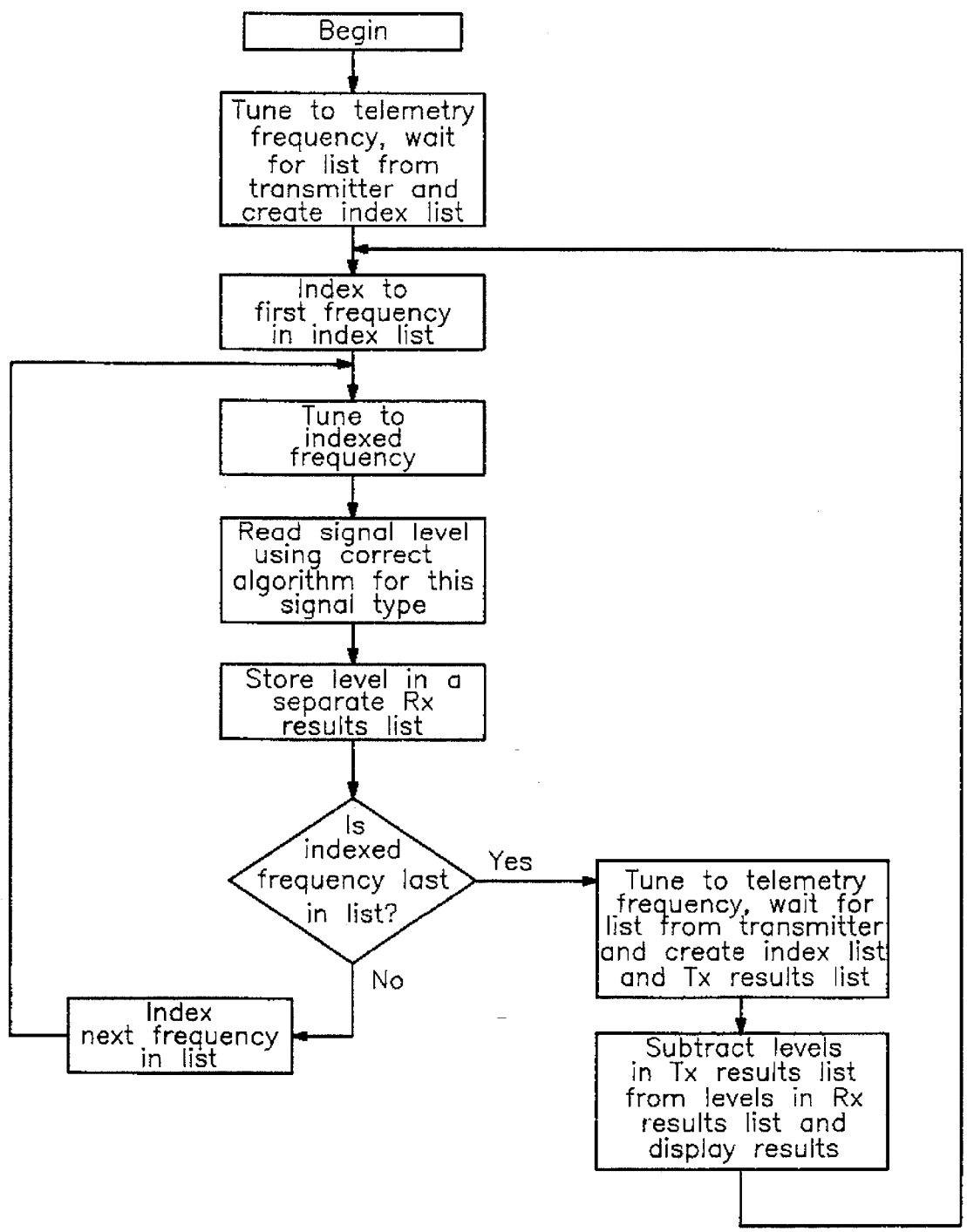
FIG. 5 is a flow chart showing the operation of the remote test unit of FIG. 3.

Referring to FIGS. 4 and 5, the operation of head end test unit 11 in conjunction with the operation of remote test unit 12 to perform a frequency sweep test of cable system 10 is described wherein FIG. 4 is a flow chart of a program for system controller and interface 100 of head end test unit 11 for the operation of head end test unit 11 and FIG. 5 is a flow chart of a program for system controller and interface 100 of remote test unit 12 for the operation of remote test unit 12. Referring to FIG. 4, when a technician or user first starts a frequency sweep test of cable system 160 the technician configures an index list in the memory of system controller and user interface 100 of head end test unit 11 by entering the list of frequencies to be included in the sweep and indication of whether each frequency is an "active" or "unused" frequency. The frequencies to be included in the sweep would typically be the frequencies for all the channels which cable system 10 can carry. As discussed above, an "active" frequency is one which is being used to transmit a television signal over coaxial cable 18 and an "unused" frequency is one which is not being used to transmit a television signal.

After the technician configures the index list, the technician initiates the frequency sweep test. Head end test unit 11 indexes to the first frequency in the index list and tunes RF transmitter 161 and RF receiver section 163 to that frequency. To do so, system controller and interface 100 opens RF switch 148 which effectively rams off RF transmitter 161. It then outputs the appropriate data on data outputs 108 which causes VCO controller 130 to tone VCO 132 to the desired frequency. The index list configured by the technician is then checked by system controller and user interface 100 to determine whether a test signal is to be generated at the desired frequency or if there is a television signal present at the desired frequency which is to be used as the test signal. If a television signal is present, system controller and user interface 100 leaves open switch 148 which effectively turns off RF transmitter 161. If a test signal is to be generated, system controller and user interface 100 closes RF switch 148 which effectively turns on RF transmitter 161 and the generated signal is transmitted onto coaxial cable 18 through RF jack 162.

In any event, regardless of whether a test signal is generated or a television signal is used as the test signal, head end test unit then measures the signal level of the test signal present on coaxial cable 18. To do so, system controller and user interface selects an appropriate algorithm for the signal type being used as a test signal. Illustratively, audio signals, video signals, pilot carriers (CW carriers) and digital carriers can be used as test signals and to optimize the measurement process, an algorithm for each type of test signal is programmed into system controller and user interface 100 and used for that particular type of test signal. It should be understood, however, that the use of different algorithms to measure different signal types is not part of the invention being claimed.

System controller and interface 100 next stores the frequency, level and signal type of the test signal it just measured in a measurement list which will be subsequently sent to remote test unit 12. System controller and user interface 100 then checks to see if the indexed frequency was the last frequency in the index list. If it is not, system controller and interface 100 indexes to the next frequency in the index list and repeats the above steps.

If the indexed frequency is the last frequency in the index table list, system controller and user interface 100 opens RF switch 148, which effectively turns off RF transmitter 161, and then tunes RF transmitter section 161 to the telemetry frequency. Illustratively, the telemetry frequency is programmable with a default of 51 MHz. RF switch 148 is then closed. System controller and user interface then transmits the measurement list, i.e., frequencies of the test signals, measured levels of the test signals, and signal type, to remote test unit 12 by generating telemetry signals containing this information and transmitting the telemetry signals to remote test unit 12.

Referring to FIG. 5, the operation of remote test unit 12 is described. Remote test unit 12 receives the telemetry signals transmitted from head end test unit 11 and from these telemetry signals generates an index list of frequencies to be tested during the sweep, signal levels for each such frequency, and signal type, all of which is stored in the memory of system controller and user interface 100. Remote test unit 12 then indexes to the first frequency in the index list and tunes to the indexed frequency. To do so, system controller and interface 100 programs VCO 132 to the appropriate frequency. Remote test unit 12 then measures the signal level of the test signal at the indexed frequency. System controller and interface 100 selects the appropriate algorithm to use based on the signal type of the test signal and then reads the digitized signal level value from analog to digital converter 198. System controller and interface 100 stores the measured signal level in a separate results list.

System controller and interface 100 then checks the index table to see if the indexed frequency was the last frequency in the list. If it was not, system controller and interface 100 indexes to the next frequency in the list and repeats the above steps. If the indexed frequency was the last frequency in the index list, system controller and interface then tunes remote test unit 12 to the telemetry frequency and receives the next set of telemetry signals from head end test unit 11 which contain data indicative of the frequencies, signal levels, and signal type of the test signals measured by head end test unit 11 during the sweep cycle. Remote test unit 12 then creates a new index list of frequencies and also an associated results list for the signals measured by the head end test unit, which will be referred to as the head end or Tx results list, which includes the signal levels measured by the head end test unit at the index frequencies. System controller and interface 100 of remote test unit 12 now subtracts the signal levels stored in the head end results list from the signal levels stored in the remote unit results list for each frequency and thus determines the frequency response of cable system 10. Remote test unit 12 will illustratively output the results, such as by displaying the results in numerical or graphical form on keypad/display 206.

Although the invention has been described in detail with reference to certain preferred embodiments, materials and specific examples, variations and modifications exist within the scope and spirit of the invention as described and as defined in the following claims.

What is claimed is:

1. In an apparatus for frequency sweeping a CATV system by transmitting test signals and telemetry signals over the CATV system, an improved method for transmitting the test signals and telemetry signals comprising the step of using a single RF transmitter to transmit both the test signals and telemetry signals.

2. The method of claim 1 further comprising the step of modulating an RF signal generated by the single RF transmitter to produce a telemetry signal.

3. An apparatus for frequency sweeping a CATV system, the CATV system having a plurality of channels, each channel having a unique frequency, the CATV system transmitting television signals over at least some of the channels, the apparatus comprising:

a. a RF transmitter for generating and transmitting test signals at a plurality of the unique channel frequencies over the CATV system;

b. a controller coupled to the RF transmitter having a memory in which is stored a list of the channel frequencies to be swept, the controller indexing through the list of channel frequencies during a sweep cycle, determining for each channel frequency in the list whether a television signal is being transmitted on that channel frequency, causing the RF transmitter to generate and transmit a test signal at each such channel frequency if a television signal is not being transmitted on that channel, and causing the RF transmitter not to transmit a test signal at those channel frequencies for the channels on which television signals are being transmitted wherein the television signals are used as test signals on those channels on which the television signals are being transmitted; and c. means for coupling the RF transmitter to the CATV system.

4. The apparatus of claim 1 and further including:

a. a RF receiver for receiving the plurality of test signals and the television signals being transmitted over the CATV system;

b. means for coupling the RF receiver to the CATV system;

c. means coupled to the RF receiver and controller for measuring the signal levels of the test signals and television signals received by the RF receiver and providing data indicative of the measured signal levels to the controller;

d. the controller storing the data indicative of the measured signal levels and data indicative of the frequency of each measured signal in its memory; and e. the controller outputting the stored data indicative of the measured signal levels and the data indicative of the frequencies of the measured signals to the same RF transmitter which generates the test signals, the RF transmitter generating telemetry signals from the outputted data and transmitting the telemetry signals over the CATV system during a telemetry cycle.

5. The apparatus of claim 4 wherein the RF receiver and RF transmitter include at least one common programmable local oscillator which is controlled by the controller to set the frequency of the test signal generated by the RF transmitter and tune the RF receiver to that frequency, and means for coupling the programmable local oscillator to the controller.

6. The apparatus of claim 5 wherein the programmable local oscillator comprises a voltage controlled oscillator.

7. The apparatus of claim 4 wherein the RF transmitter includes a tracking signal generator to generate the test signals, the tracking signal generator having at least one programmable local oscillator in common with the RF receiver, the programmable local oscillator controlled by the controller to tune the RF receiver to the frequencies being swept and set the frequencies of the test signals generated by the tracking signal generator, and means for coupling the programmable local oscillator to the controller.

8. The apparatus of claim 7 wherein the programmable local oscillator comprises a voltage controlled oscillator.

9. The apparatus of claim 4 and further including means for inputting into the controller's memory the list of channel frequencies to be swept and information indicative of whether the CATV is transmitting a television signal on the channels having those frequencies, the controller determining whether the CATV system is transmitting a television signal on a channel based on said stored information indicative of whether the CATV is transmitting a television signal on the channels having those frequencies.

10. An apparatus for frequency sweeping a CATV system having a plurality of channels, each channel having a unique frequency, the CATV system transmitting television signals over at least some of the channels, the apparatus comprising:

a. a RF transmitter for generating test signals at a plurality of the unique channel frequencies and transmitting the test signals over the CATV system during a sweep cycle;

b. a controller coupled to the RF transmitter having a memory in which is stored a list of the channel frequencies to be swept, the controller indexing through the list of channel frequencies during the sweep cycle, determining for each channel frequency in the list whether a television signal is being transmitted on that channel frequency, causing the RF transmitter to generate and transmit a test signal at each such channel frequency if a television signal is not being transmitted on that channel, and causing the RF transmitter not to transmit a test signal at those channel frequencies for the channels on which television signals are being transmitted wherein the television signals are used as test signals on those channels on which the television signals are being transmitted;

c. a RF receiver for receiving during the sweep cycle the plurality of test signals and the television signal test signals being transmitted over the CATV system;

d. means coupled to the RF receiver and controller for measuring the signal levels of the test signals and television signal test signals received by the RF receiver and providing data indicative of the measured signal levels to the controller;

e. the controller storing the data indicative of the measured signal levels and data indicative of the frequency of each measured signal in its memory; and f. the controller during a telemetry cycle outputting the stored data indicative of the measured signal levels and data indicative of the frequencies of the measured signals to the same RF transmitter which generates the test signals, the RF transmitter generating telemetry signals from the outputted data and transmitting the telemetry signals over the CATV system.

11. The apparatus of claim 10 wherein the RF transmitter includes a tracking signal generator to generate the test signals, the tracking signal generator having at least one programmable local oscillator in common with the RF receiver, the programmable local oscillator controlled by the controller to tune the RF receiver to the frequencies being swept and set the frequencies of the test signals generated by the tracking signal generator, and means for coupling the programmable local oscillator to the controller.

12. The apparatus of claim 11 wherein the programmable local oscillator comprises a voltage controlled oscillator.

13. The apparatus of claim 10 and further including means for inputting into the controller's memory the list of channel frequencies to be swept and information indicative of whether the CATV is transmitting a television signal on the channels having those frequencies, the controller determining whether the CATV system is transmitting a television signal on a channel based on said stored information indicative of whether the CATV is transmitting a television signal on the channels having those frequencies.

14. A system for frequency sweep testing a CATV system having a plurality of channels, each channel having a unique frequency, the CATV system transmitting television signals over at least some of the channels, the test system comprising:
   a. a head end test unit for coupling to the CATV system at a head end of the CATV system;
   b. a remote test unit for coupling to the CATV system at a location remote from the head end of the CATV system;
   c. the test system having a sweep cycle and a telemetry cycle;
   d. the head end test unit including:
      i. a RF transmitter for generating test signals at a plurality of the unique channel frequencies and transmitting the test signals over the CATV system during the sweep cycle;
      ii. a controller coupled to the RF transmitter having a memory in which is stored a list of the channel frequencies to be swept, the controller indexing through the list of channel frequencies during the sweep cycle, determining for each channel frequency in the list whether a television signal is being transmitted on that channel frequency, causing the RF transmitter to generate and transmit a test signal at each such channel frequency if a television signal is not being transmitted on that channel, and causing the RF transmitter not to transmit a test signal at those channel frequencies for the channels on which television signals are being transmitted wherein the television signals are used as test signals on those channels on which the television signals are being transmitted;
      iii. a RF receiver for receiving during the sweep cycle the plurality of test signals and the television signal test signals being transmitted over the CATV system;
      iv. means coupled to the RF receiver and controller for measuring the signal levels of the test signals and television signal test signals received by the RF receiver and providing data indicative of the measured signal levels to the controller;
      v. the controller storing the data indicative of the measured signal levels and data indicative of the frequency of each measured signal in its memory; and
      vi. the controller during the telemetry cycle outputting the stored data indicative of the measured signal levels and data indicative of the frequencies of the measured signals to the same RF transmitter which generates the test signals, the RF transmitter generating telemetry signals from the outputted data and transmitting the telemetry signals over the CATV system to the remote test unit;
   e. the remote test unit comprising:
      i. a controller;
      ii. a RF receiver for receiving the test signals, television signal test signals and telemetry signals transmitted over the CATV system;
      iii. means coupled to the RF receiver and the controller for convening the telemetry signals to data which contains the list of frequencies to be swept during the next sweep cycle and the measured signal levels of the frequencies swept during the just completed sweep cycle transmitted from the head end test unit;
      iv. the controller of the remote test unit reading the data generated from the telemetry signals and storing the list of frequencies to be swept in an index list in its memory and storing the measured signal levels transmitted by the head end test unit of the frequencies swept during the just completed sweep cycle in a list in its memory;
      v. the controller causing the remote test unit to begin the next sweep cycle at the end of the telemetry cycle and during the sweep cycle to measure the signal levels of the test signals and television signal test signals received by the RF receiver of the remote test unit and providing data indicative of the measured signal levels to the controller of the remote test unit;
      vi. the controller of the remote test unit storing the data indicative of the measured signals received by the RF receiver in the memory of the controller;
      vii. the controller of the remote test unit determining results of the frequency sweep test based on the signal levels measured by the remote test unit and the signal levels transmitted from the head end test unit.

15. The system of claim 14 wherein the controller of the remote test unit determines a frequency response of the CATV system from the signal levels measured by the remote test unit and the signal levels transmitted from the head end test unit.

16. The system of claim 14 wherein the controller of the remote test unit has a data output through which the controller outputs data indicative of the test results.

17. The system of claim 16 wherein the remote test unit includes a display coupled to the data output.

18. The system of claim 14 wherein the RF transmitter includes a tracking signal generator to generate the test signals, the tracking signal generator having at least one programmable local oscillator in common with the RF receiver, the programmable local oscillator controlled by the controller to tune the RF receiver to the frequencies being swept and set the frequencies of the test signals generated by the tracking signal generator, and means for coupling the programmable local oscillator to the controller.

19. The system of claim 18 wherein the programmable local oscillator comprises a voltage controlled oscillator.

20. The system of claim 14 and further including means for inputting into the controller's memory the list of channel frequencies to be swept and information indicative of whether the CATV is transmitting a television signal on the channels having those frequencies, the controller determining whether the CATV system is transmitting a television signal on a channel based on said stored information indicative of whether the CATV is transmitting a television signal on the channels having those frequencies.

21. In an apparatus for frequency sweeping a CATV system, the CATV system having a plurality of channels, each channel having a unique frequency, the CATV system transmitting television signals over at least some of the channels, an improved method of frequency sweeping the CATV system, comprising the steps of:
   a. indexing through channel frequencies to be swept during a sweep cycle;
   b. determining for each channel frequency included in the sweep whether a television signal is being transmitted by the CATV system over the channel having that channel frequency;
   c. for each channel over which the CATV system is not transmitting a television signal, generating a test signal at that channel frequency and transmitting that test signal over the CATV system; and d. for each channel over which the CATV system is transmitting a television signal, using the television signal as a test signal for that channel frequency.

22. The method of claim 21 and further including the steps of:
   a. receiving the test signals and television signal test signals transmitted over the CATV system;
   b. measuring the signal levels of the test signals and television signal test signals; and
   c. generating and transmitting telemetry data indicative of the measured signal levels and frequencies of the measured signals over the CATV system using the same transmitter which transmits the test signals generated by the transmitter.

23. The method of claim 22 and further including the step of inputting information into a memory of the apparatus for each channel frequency to be included in the sweep which indicates whether a television signal is being transmitted on that channel, the step of determining whether a television signal is being transmitted on a particular channel frequency including the step of checking the stored information and making the determination based on the stored information.

24. The method of claim 23 and further including the step of inputting information into the memory of the apparatus which indicates which channel frequencies are to be included in the sweep and the step of indexing through the channel frequencies to be included in the sweep includes indexing through the information indicative of the channel frequencies to be included in the sweep.

25. In an apparatus for frequency sweeping a CATV system, the CATV system having a plurality of channels, each channel having a unique frequency, the CATV system transmitting television signals over at least some of the channels, an improved method of frequency sweeping the CATV system, comprising the steps of:
   a. indexing through channel frequencies to be swept during a sweep cycle;
   b. determining for each channel frequency included in the sweep whether a television signal is being transmitted by the CATV system over the channel having that channel frequency;
   c. for each channel over which the CATV system is not transmitting a television signal, generating a test signal at that channel frequency and transmitting that test signal over the CATV system; and
   d. for each channel over which the CATV system is transmitting a television signal, using the television signal as a test signal for that channel frequency;
   e. receiving the test signals and television signal test signals transmitted over the CATV system;
   f. measuring the signal levels of the test signals and television signal test signals; and
   g. generating and transmitting telemetry data indicative of the measured signal levels and frequencies of the measured signals over the CATV system using the same transmitter which transmits the test signals generated by the transmitter.

26. The method of claim 25 and further including the step of inputting information into a memory of the apparatus for each channel frequency to be included in the sweep which indicates whether a television signal is being transmitted on that channel, the step of determining whether a television signal is being transmitted on a particular channel frequency including the step of checking the stored information and making the determination based on the stored information.

27. The method of claim 26 and further including the step of inputting information into the memory of the apparatus which indicates which channel frequencies are to be included in the sweep and the step of indexing through the channel frequencies to be included in the sweep includes indexing through the information indicative of the channel frequencies to be included in the sweep.

28. In an system for frequency sweep testing a CATV system which has successive frequency sweep test cycles, each cycle comprising a sweep cycle and a telemetry cycle, the CATV system having a plurality of channels, each channel having a unique frequency, the CATV system transmitting television signals over at least some of the channels, the system having a head end test unit for coupling to the CATV system at a head end of the CATV system and a remote test unit for coupling to the CATV system at a location remote from the head end, an improved method of frequency sweep testing the CATV system, comprising the steps of:
   a. having the head end test unit:
      i. during a sweep, index through channel frequencies to be swept and determine for each channel frequency included in the sweep whether a television signal is being transmitted by the CATV system over the channel having that channel frequency;
      ii. during the sweep, for each channel over which the CATV system is not transmitting a television signal, generate a test signal at that channel frequency and inject that test signal into the CATV system at a head end of the CATV system for transmission over the CATV system with a transmitter that is part of the head end test unit;
      iii. for each channel over which the CATV system is transmitting a television signal, to not inject a test signal into the CATV system wherein the television signal on that channel is used as a test signal for that channel frequency;
      iv. measure the signal levels of the test signals and television signal test signals; and;
      v. at the conclusion of the sweep, generate and inject telemetry signals indicative of the signal levels measured by the head end test unit and the frequencies of the measured signals onto the CATV system at its head end for transmission over the CATV system using the same transmitter which transmits the test signals generated by the transmitter;
   b. having the remote test unit:
      i. during the sweep, index through a list of channel frequencies to be included in the sweep and for each such channel frequency, measuring the signal level of the test signal or television signal test signal at that frequency;
      ii. at the conclusion of the sweep, receive the telemetry signals from the head end and generate the list of channel frequencies to be included in the next sweep therefrom and also generate a table of the signal level measurements made at the head end therefrom; and
      iii. determine the frequency response of the CATV system based on the signal level measurements made at the remote location by the remote test unit with the signal level measurements made at the head end.

29. The method of claim 28 and further including the step of having the remote test unit displaying the frequency response of the CATV system.

30. The method of claim 28 and further including the step of inputting information into a memory of the head end test unit for each channel frequency to be included in the sweep which indicates whether a television signal is being transmitted on that channel, the step of having the head end test unit determine whether a television signal is being transmitted on a particular channel frequency including the step of having the head end test unit check the stored information and making the determination based on the stored information.

31. The method of claim 30 and further including the step of inputting information into the memory of the head end test unit which indicates which channel frequencies are to be included in the sweep and the step of having the head end test unit index through the channel frequencies to be included in the sweep includes having the head end test unit index through the information indicative of the channel frequencies to be included in the sweep.

* * * * *